(No Model.)

Z. DAVIS.
VAPOR BURNING STREET LAMP.

No. 306,002. Patented Sept. 30, 1884.

Witnesses.
Louis F. Gardner
J. W. Garner

Inventor.
Z. Davis,
per
J. A. Lehmann, Atty.

UNITED STATES PATENT OFFICE.

ZEBULON DAVIS, OF CANTON, OHIO.

VAPOR-BURNING STREET-LAMP.

SPECIFICATION forming part of Letters Patent No. 306,002, dated September 30, 1884.

Application filed December 29, 1883. (No model.)

*To all whom it may concern:*

Be it known that I, ZEBULON DAVIS, of Canton, in the county of Stark and State of Ohio, have invented certain new and useful Improvements in Vapor-Burner Street-Lamps; and I do hereby declare the following to be a full, clear, and exact description of the invention, such as will enable others skilled in the art to which it pertains to make and use it, reference being had to the accompanying drawings, which form part of this specification.

My invention relates to an improvement in vapor-burner street-lamps; and it consists, first, in the combination of the reservoir-jacket, the supply-pipe, and the burner, which is attached to the lower end of the pipe, with the lantern provided with a slotted or recessed support, through which the pipe passes, the jacket, pipe, and burner being made separate from the lantern, so that they can be detached at any time. The object of this part of my invention is to make the reservoir and all of the burner attachments removable from the lantern, so that the burner can be detached for the purpose of being heated while being carried to the lamps, and so that the burner can be swung freely outside of the door for the purpose of being lighted or in cleaning the lantern.

Second, the combination of the reservoir jacket or shell with a removable reservoir provided with a screw-threaded opening upon its lower end and a screw-cap carrying an air-pipe with it. The object of this part of my invention is to so construct the parts that the reservoir is made self-feeding, and thus always keep the same head of fluid upon the burner, whereby the flame is kept at a uniform size from the time of lighting the burner until the oil is exhausted.

Figure 1:
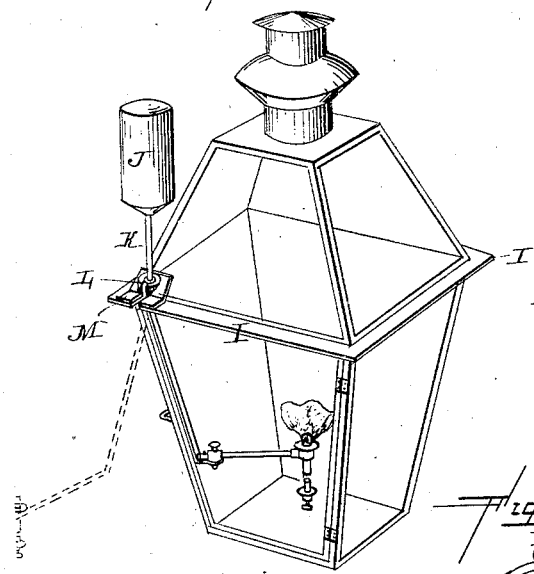
Figure 2:
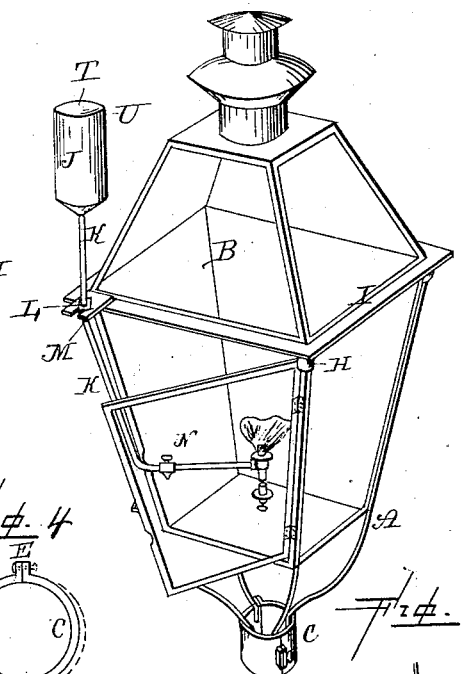
Figure 4:
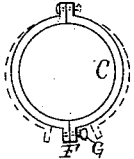
Figure 3:
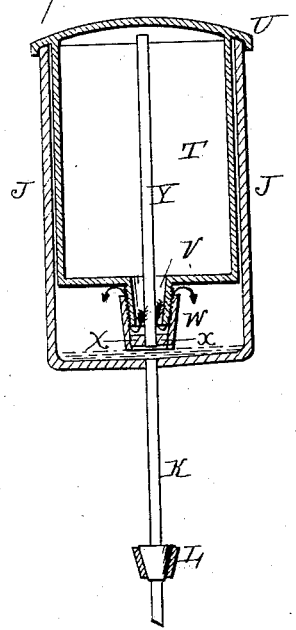
Figure 5:
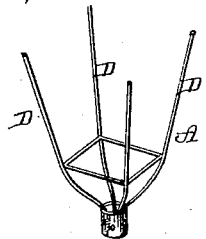

Figure 1 is a perspective of a street-lamp embodying a portion of my invention. Fig. 2 is a similar view showing the invention complete. Fig. 3 is a vertical section of the reservoir. Fig. 4 is a detached view of the collar or socket of the basket. Fig. 5 is a perspective of the basket or holder for the lantern by itself.

A represents the basket or holder in which the lantern B is to be placed, and which frame or holder is made in two separate pieces. The collar C, which fits upon top of the post, and which has the arms or prongs D radiating therefrom, is provided with the flanges E upon one side, and through which suitable rivets or bolts are passed for the purpose of securing the two parts of the collar together. These bolts or rivets will allow a slight play or outward movement to the two parts, so as to allow them to be slightly open upon the opposite side, as shown in Fig. 5. From the opposite side from the flanges E are similar flanges, F, through which is passed a suitable set-screw for the purpose of clamping or tightening the collar C tightly around the top of the supporting-post. By making the collar in two parts it is adapted to fit posts of different sizes, and can be readily removed and replaced at any time.

By making the holder or basket A in two parts, as is here shown, a much lighter, cheaper, and more graceful holder or basket can be produced, for the castings can be made more easily. The arms or prongs D project upward around the four corners of the lantern B, and have their upper ends to fit in the sockets H, which are made on the under side of the flange I, which runs around the lantern in the usual manner.

By providing the lantern B with the socket and making the lantern and the basket or holder entirely separate and distinct, the lantern and all of its attachments can be removed from the basket or holder at any time for the purpose of being cleaned or repaired. When the lantern is removed, the basket or holder remains in position upon the post, as shown in Fig. 6. This construction enables the lanterns to be taken down where the operator can handle them with perfect ease for any purpose. Heretofore the burner and the reservoir-shell or reservoir have always been attached permanently to the lantern.

Instead of making my burner and its attachments a part of the lantern, they are here made entirely separate and distinct, so that they can be removed, as shown in Fig. 4, and so that the burner can be swung around outside of the lantern, as shown in Fig. 1, while the burner is being heated ready to light.

The reservoir J has the supply-pipe K secured rigidly to it, and upon this supply-pipe is screwed a conical ring, collar, or support, L, of any desired shape, size, or construction, and which catches in a suitable mortise or opening in the casting M, which is secured to the flange I, preferably at or near one corner. This collar or support L prevents the burner from sinking beyond the desired point, and forms a support by which all of the burner attachments are held securely in position while in operation. The supply-pipe K may pass down inside of the lantern after passing below the flange I, as shown in Fig. 1, or it may extend down outside of the lantern until it reaches that part where it passes through the opening, which is made partly in the door and partly in the frame of the lantern. In both cases the door of the lantern must be swung open, so that the burner may be inserted in position or removed therefrom.

Any suitable device may be employed either inside of the lantern or outside for the purpose of locking the lower end of the pipe rigidly in position, so that the burner cannot be removed out of the space from any jarring or shaking of any of the parts of the lantern.

When the reservoir-jacket J, supply-pipe K, and the burner, which are all secured together, as shown in Fig. 4, are to be removed from the lantern, the door must first be opened, and then the pipe is raised upward until the collar L is freed from the casting M, when the parts are pulled outward through the mortise or slot in the casting. When the burner is being lighted without removing it from the lantern B, this pipe K is caught at its lower end and the burner is swung around outside of the lantern, as shown in Fig. 1, where the drip-cup can be filled and the burner lighted in the ordinary manner without having the smoke from the burning oil blacken the glass, so as to obscure the light. After the burner has been lighted, it is only necessary to turn it back into position.

Each one of the reservoirs T is provided at its upper end with the flange U, which catches over the top of the shell J, so as to keep out rain and snow and to support the reservoir in position. Upon the lower end of the reservoir is formed the conical externally screw-threaded neck V, upon which the closing-cap W is screwed. Inside of this screw-cap W, at some distance from its lower end, is inserted the perforated disk X, to which the air-pipe Y is secured. The lower edge of the cap W projects down a suitable distance below its head X and below the lower end of the pipe Y, for the purpose of forming an edge below the end of the air-pipe, from which the oil drops into the bottom of the shell J, and thus prevents the oil from flowing across and closing the air-pipe Y, so that no air can pass up into the top of the reservoir T. This pipe Y is just long enough to bear against the top of the reservoir T when the cap W is screwed tightly in position, and thus close the upper end of the pipe Y, and prevent any leakage of oil from the shaking about of the oil while the reservoir is being transported in a vertical position. Before the reservoir T is inserted in the shell J, the cap W is partially unscrewed, as shown in Fig. 3, so as to allow a slight leakage of the oil in between the threads of the necks V and cap W, at the same time withdrawing the upper end of the air-pipe Y from its bearing against the top of the reservoir. After the reservoir is placed in position, a leakage of the oil takes place, as above described, in the bottom of the shell, at the same time the air passes through the pipe Y into the top of the reservoir. The air which supplies the pipe Y passes in between the shell and the reservoir, the parts being made to fit loosely for this purpose. Oil continues to rise in the bottom of the shell J after filling the pipe K until it reaches the flange on the bottom of the cap W. As soon as it reaches this flange, the oil forms a seal, and, by preventing any more air from passing into the reservoir, stops any more leakage of the oil from the reservoir until the consumption of the oil by the burner again uncovers the air-pipe, when the leakage again begins. In this manner a constant level of the oil is maintained in the jacket, and thus a uniform pressure is produced upon the burner. The consequence is that an even and steady flame is produced from the lighting of the burner until the oil is all consumed.

Where no provision is made for securing a uniform pressure upon the burner, the size of the flame will vary with the consumption of the oil.

Having thus described my invention, I claim—

1. The combination of the reservoir-shell, the supply-pipe secured thereto, the burner, and the lantern having a slotted or recessed supporting device through which the supply-pipe passes, the shell, pipe, and burner being secured together, so as to form practically a single piece, and which are made removable from the lantern, substantially as shown.

2. The combination of the lantern provided with a suitable support, with the burner, supply-pipe, and reservoir-shell, the supply-pipe being provided with a suitable collar or enlargement for catching upon the support, whereby the burner can be swung around out of the lantern, substantially as shown.

3. The combination of the shell, a removable reservoir which is applied thereto, having a filling-neck upon one end, with a cap having a flange upon its lower edge, and an air-tube which is secured to the cap, substantially as set forth.

In testimony whereof I affix my signature in presence of two witnesses.

ZEBULON DAVIS.

Witnesses:
F. A. LEHMANN,
B. LEWIS BLACKFORD.